(12) United States Patent
Miyauchi et al.

(10) Patent No.: US 7,578,128 B2
(45) Date of Patent: Aug. 25, 2009

(54) AIR BYPASS VALVE FAILURE DETECTION DEVICE IN SUPERCHARGING DEVICE FOR ENGINE

(75) Inventors: Atsuhiro Miyauchi, Saitama (JP);
Hirofumi Hara, Saitama (JP);
Kazuhiko Imamura, Saitama (JP);
Yoshinori Andou, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 4 days.

(21) Appl. No.: 11/878,117

(22) Filed: Jul. 20, 2007

(65) Prior Publication Data
US 2008/0022968 A1    Jan. 31, 2008

(30) Foreign Application Priority Data
Jul. 20, 2006    (JP) ............................. 2006-197589

(51) Int. Cl.
*F02B 33/00*    (2006.01)
(52) U.S. Cl. ......................... 60/611; 123/561
(58) Field of Classification Search .................. 60/611; 123/561
See application file for complete search history.

(56) References Cited
U.S. PATENT DOCUMENTS
4,774,812 A * 10/1988 Hitomi et al. .................. 60/611
5,694,899 A * 12/1997 Chvatal et al. ................. 60/611
6,810,667 B2 * 11/2004 Jung et al. ..................... 60/611
6,990,814 B2 * 1/2006 Boley et al. ................... 60/611
2006/0248889 A1 * 11/2006 Sagisaka et al. ............... 60/602

FOREIGN PATENT DOCUMENTS
| JP | 7-46737 | 10/1995 |
| JP | 07-046737 | * 10/1995 |
| JP | 2006057526 A | * 3/2006 |

* cited by examiner

*Primary Examiner*—Thomas E Denion
*Assistant Examiner*—Mary A Davis
(74) *Attorney, Agent, or Firm*—Squire, Sanders & Dempsey L.L.P.

(57) ABSTRACT

An air bypass valve failure detecting device outputs an opening command to an air bypass valve when a throttle valve suddenly closes, thereby prevent surging from occurring in a second intake passage between a turbocharger and a throttle valve. When the opening command is outputted to the air bypass valve, failure detection for the air bypass valve is permitted only if an intake air quantity of an engine immediately before a closing command is changed to the opening command is equal to or larger than a predetermined value. Thus, it is possible to prevent the failure detecting device from erroneously determining that the air bypass valve is normal although valve closing failure of the air bypass valve has occurred. This is because, when the intake air quantity is smaller than the predetermined value, surging does not occur in the second intake passage even if the valve closing failure of the airy bypass valve has occurred.

10 Claims, 13 Drawing Sheets

AIR BYPASS VALVE FAILURE DETECTION DEVICE IN SUPERCHARGING DEVICE FOR ENGINE

BACKGROUND OF THE INVENTION

1. Field of the Invention

The present invention relates to an air bypass valve failure detection device in a supercharging device of an engine, the supercharging device comprising: a first intake passage, a supercharger, a second intake passage, a throttle valve, and a third intake passage which are sequentially arranged from an upstream side to a downstream side in a flowing direction of an intake air flowing to a cylinder of the engine; a bypass passage bypassing the supercharger and connecting the first and second intake passages to each other; an air bypass valve provided in the bypass passage; the supercharging device outputting an opening command to the air bypass valve, when a rate of change in a throttle valve opening degree in a throttle valve closing direction is equal to or larger than a predetermined value.

2. Description of Related Art

Japanese Utility Model Publication No. 7-46737 discloses a device in which a blower (a compressor) of a turbocharger on an upstream side and a throttle valve on a downstream side are arranged in an intake passage of an engine, and a relief valve (an air bypass valve) is arranged in a relief passage (a bypass passage) that bypasses the blower of the turbo charger. When a difference between a detected value of an intake air quantity (or of a pressure of the intake passage between the blower and the throttle valve) and a time average value of the detected values is equal to or larger than a predetermined value at the time of sudden closure of the throttle valve, i.e., when the relief valve does not normally open and surging occurs in the intake passage, the device determines that a valve closing failure has occurred where the relief valve is stuck in a valve closing position.

The conventional device performs failure detection for the relief valve only on condition that the throttle valve has suddenly closed. Thus, there is a possibility that the device erroneously determines that the relief valve is normal even when the valve closing failure of the relief valve occurs. This is because, when the throttle valve suddenly closes and the failure detection is started, if an intake air quantity flowing through the intake passage is small, surging does not occur in the intake passage although the valve closing failure of the relief valve occurs, leading to a possibility that the device erroneously determines that the relief valve is normal only for the reason that surging has not occurred.

SUMMARY OF THE INVENTION

The present invention has been achieved in view of the circumstances, and it is an object of the present invention to accurately detect a valve closing failure of an air bypass valve provided in a bypass passage that bypasses a compressor of a supercharger provided in an intake passage.

In order to achieve the above object, according to a first feature of the present invention, there is provided an air bypass valve failure detection device in a supercharging device of an engine, the supercharging device comprising: a first intake passage, a supercharger, a second intake passage, a throttle valve, and a third intake passage which are sequentially arranged from an upstream side to a downstream side in a flowing direction of an intake air flowing to a cylinder of the engine; a bypass passage bypassing the supercharger and connecting the first and second intake passages to each other; an air bypass valve provided in the bypass passage; the supercharging device outputting an opening command to the air bypass valve, when a rate of change in a throttle valve opening degree in a throttle valve closing direction is equal to or larger than a predetermined value, the air bypass valve failure detection device comprising: failure detection permitting means for permitting failure detection for the air bypass valve, when a command to the air bypass valve is an opening command and an intake air quantity of the engine immediately before the command is changed from a closing command to the opening command is equal to or larger than a predetermined value; surging determining means for determining whether surging has occurred in the second intake passage, when the failure detection permitting means permits the failure detection for the air bypass valve; and failure determining means for determining that valve closing failure of the air bypass valve has occurred when the surging determining means determines that surging has occurred, and determining that the air bypass valve is normal when the surging determining means determines that surging has not occurred.

With this arrangement, the failure detecting device outputs the opening command to the air bypass valve when the throttle valve suddenly closes, and prevents surging from occurring in the second intake passage between the supercharger and the throttle valve. When the opening command is outputted to the air bypass valve, failure detection for the air bypass valve is permitted only when the intake air quantity of the engine immediately before the command is changed from the closing command to the opening command is equal to or larger than the predetermined value. Thus, it is possible to prevent the failure detecting device from erroneously determining that the air bypass valve is normal although a valve closing failure of the air bypass valve has occurred. This is because, when the intake air quantity of the engine immediately before the command is changed from the closing command to the opening command is smaller than the predetermined value, surging does not occur in the second intake passage although the valve closing failure of the air bypass valve has occurred, leading to a possibility that the failure detecting device erroneously determines that the air bypass valve normally opens. However, if the failure detection is permitted only when the intake air quantity is equal to or larger than the predetermined value, it is possible to prevent such an erroneous determination.

According to a second feature of the present invention, in addition to the first feature, the surging determining means extracts a specific frequency component of fluctuation in an intake pressure or fluctuation in an intake air quantity in the second intake passage, and determines that surging has occurred when an integrated value of the extracted values exceeds a predetermined value.

With this arrangement, the specific frequency components are extracted from the fluctuation in the intake pressure or the fluctuation in the intake air quantity in the second intake passage and, when the integrated value of values of the extraction exceeds the predetermined value, it is determined that surging has occurred. Thus, even if noise is contained in the detected value of the intake pressure of the second intake passage, it is possible to eliminate an influence of the noise to perform an accurate failure detection.

According to a third feature of the present invention, in addition to the second feature, the failure detection permitting means does not permit the failure detection until a predetermined time elapses after the command to the air bypass valve is changed from the closing command to the opening command.

When the valve closing failure of the air bypass valve has occurred and the air bypass valve is kept in the valve closed state although the air bypass valve should be opened, an intake pressure of the second intake passage suddenly increases immediately after the valve close failure to cause fluctuation in an intake pressure or fluctuation in an intake air quantity of frequency components other than the specific frequency components. Thus, it is difficult to accurately determine occurrence of surging. However, in the above-described arrangement, failure detection is not permitted until the predetermined time elapses after the command to the air bypass valve is changed from the closing command to the opening command, and the failure detection is permitted after an influence of the sudden increase in the intake pressure of the second intake passage weakens. Thus, it is possible to improve detection accuracy.

According to a fourth feature of the present invention, in addition to the second feature, the surging determining means calculates the integrated value until a predetermined time elapses after the failure detection permitting means permits the failure detection; and the failure determining means determines that surging has occurred when the integrated value upon lapse of the predetermined time exceeds the predetermined value.

With this arrangement, the integrated value of the extracted values is calculated until the predetermined time elapses after the failure detection is permitted, and it is determined that surging has occurred when the integrated value upon lapse of the predetermined time exceeds the predetermined value. Thus, it is possible to integrate the extracted values in a sufficient amount and remove an influence of noise.

According to a fifth feature of the present invention, in addition to the fourth feature, the failure detection permitting means cancels the failure detection when the predetermined time elapses after the failure detection is permitted; and the surging determining means reduces the integrated value to zero when the failure detection permitting means cancels the failure detection.

With this arrangement, the integrated value is reduced to zero when the failure detection is cancelled, thereby constantly calculating the integrated value under the same condition (for the predetermined time after the failure detection is permitted). Thus, it is possible to accurately determine occurrence of surging.

A turbocharger 25 in an embodiment corresponds to the supercharger of the present invention.

The above-mentioned object, other objects, characteristics, and advantages of the present invention will become apparent from a preferred embodiment, which will be described in detail below by reference to the attached drawings.

DETAILED DESCRIPTION OF THE PREFERRED EMBODIMENT

Figure 1:
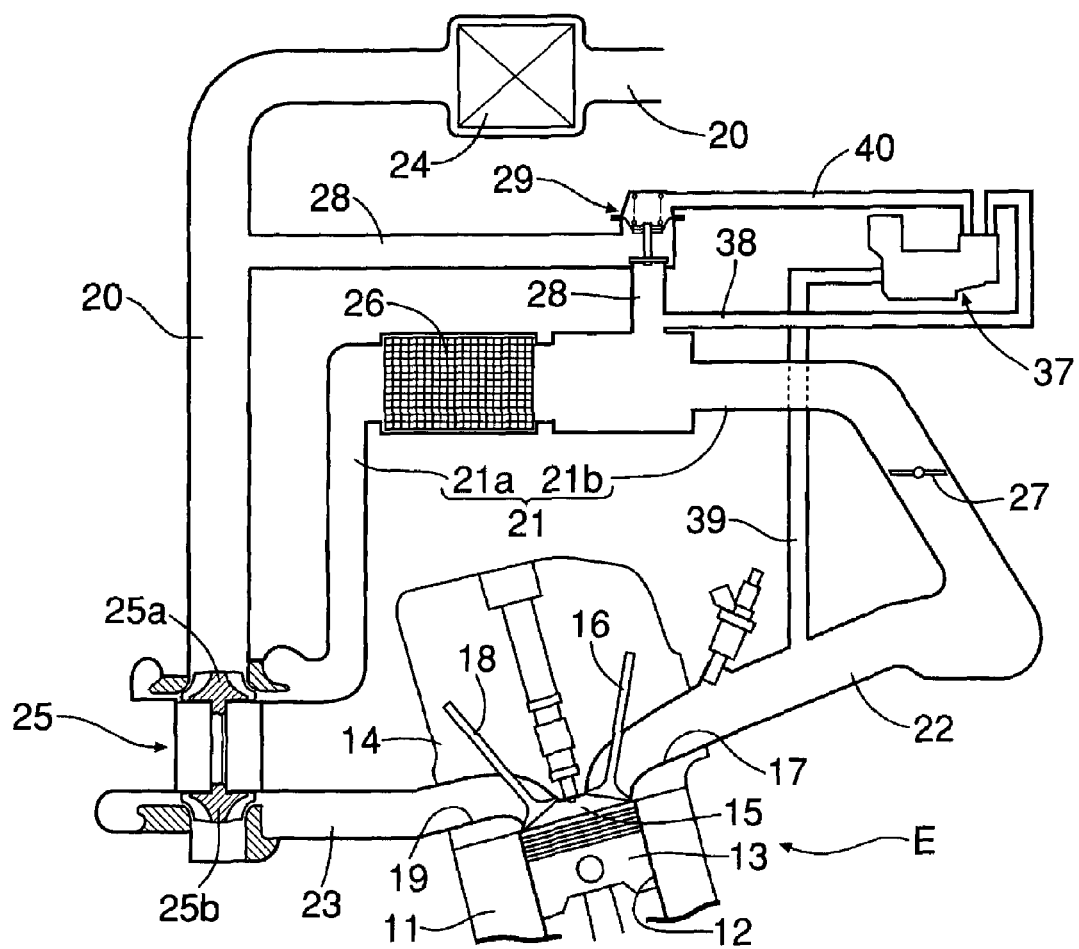
FIG. 1 is a diagram showing an intake system of an engine including a turbocharger according to an embodiment of the present invention.
Figure 2:
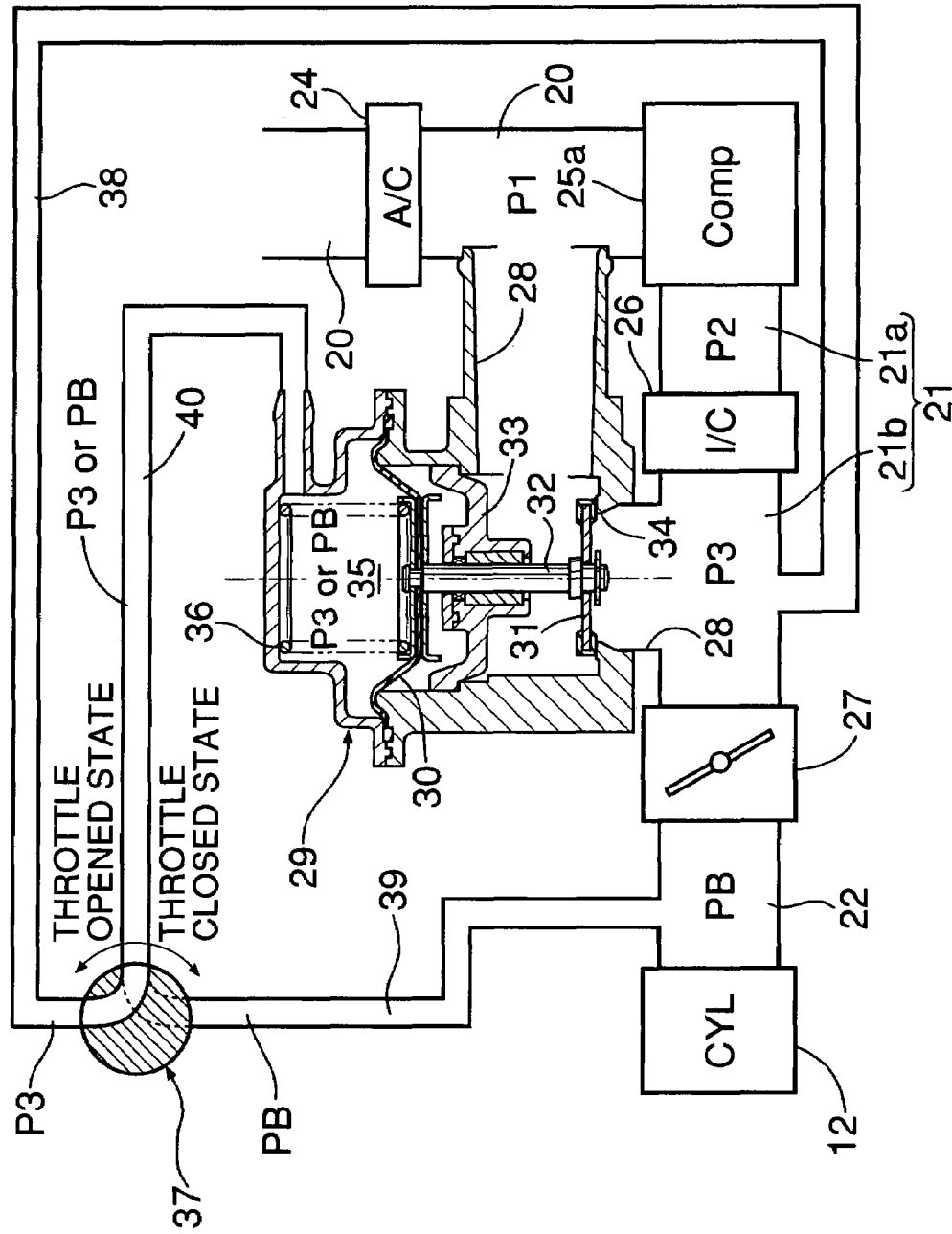
FIG. 2 is a diagram showing a structure of an air bypass valve.

As shown in FIGS. 1 and 2, an engine E includes a piston 13 that slidably fits in a cylinder 12 provided in a cylinder block 11. An intake port 17 and an exhaust port 19 communicate with a combustion chamber 15 formed between an upper surface of the piston 13 and a lower surface of a cylinder head 14. The intake port 17 is opened and closed by an intake valve 16. The exhaust port 19 is opened and closed by an exhaust valve 18. From an upstream side to a downstream side in a flowing direction of an intake air, a first intake passage 20 is connected to a second intake passage 21, which is connected to a third intake passage 22, which is connected to the intake port 17. An exhaust passage 23 is connected to the exhaust port 19.

An air cleaner 24 is arranged in the first intake passage 20. A compressor 25a of a turbocharger 25 is arranged between the first intake passage 20 and the second intake passage 21. An intercooler 26 is arranged between an upstream section 21a and a downstream section 21b of the second intake passage 21. A throttle valve 27 is arranged between the second intake passage 21 and the third intake passage 23. A turbine 25b of the turbo charger 25 is arranged in the exhaust passage 23.

A pressure in the first intake passage 20 is defined as a P1 pressure, a pressure in the upstream section 21a of the second intake passage 21 is defined as a P2 pressure, a pressure in the downstream section 21b of the second intake passage 21 is defined as a P3 pressure, and a pressure in the third intake passage 22 is defined as a PB pressure.

The first intake passage 20 provided downstream the air cleaner 24 and the downstream section 21b of the second intake passage 21 provided between the intercooler 26 and the throttle valve 27 are connected to each other by a bypass passage 28. An air bypass valve 29 is arranged in an intermediate portion of the bypass passage 28. The air bypass valve 29 includes a diaphragm 30, a valve body 31, a rod 32 connected at opposite ends thereof to the diaphragm 30 and the valve body 31, a guide member 33 that slidably guides the rod 32, a valve seat 34 on which the valve body 31 can be seated, a pressure chamber 35 that faces the diaphragm 30 on one side thereof, and a valve spring 36 which is arranged in the pressure chamber 35 to urge the diaphragm 30 downward (in a direction in which the valve body 31 is seated on the valve seat 34).

A control valve 37 comprises a solenoid valve that controls opening and closing of the air bypass valve 29. The control valve 37 is connected to the downstream section 21b of the second intake passage 21 via a first communication path 38, is connected to the third intake passage 22 via a second communication path 39, and communicates with the pressure chamber 35 of the air bypass valve 29 via a third communication path 40.

The control valve 37 is switched corresponding to a throttle opening degree. When the throttle valve 27 is open, the control valve 37 causes the first communication path 38 to communicate with the third communication path 40, thereby introducing the P3 pressure in the downstream section 21b of the second intake passage 21 into the pressure chamber 35 of the air bypass valve 29. When the throttle valve 27 is closed, the control valve 37 causes the second communication path 39 to communicate with the third communication path 40, thereby introducing the PB pressure in the third intake passage 22 into the pressure chamber 35 of the air bypass valve 29.

A condition under which the control valve 37 causes the second communication path 39 to communicate with the third communication path 40, thereby introducing the PB pressure in the third intake passage 22 into the pressure chamber 35 of the air bypass valve 29, is any one of the following.

(a) A throttle opening degree is equal to or smaller than an idling determination value (a fully closed state of the throttle).
(b) A supercharging pressure ratio is equal to or larger than a predetermined value (an excessive supercharging state).
(c) A rate of change in the throttle opening degree is equal to or larger than a predetermined value in a throttle valve closing direction (a suddenly closed state of the throttle valve).

Therefore, when the throttle valve 27 is open, i.e., when the turbocharger 25 is performing supercharging, the relatively large P3 pressure acts on the pressure chamber 35 and this downward P3 pressure cancels the upward P3 pressure that urges the valve body 31 in the valve opening direction. Thus, the valve body 31 is seated on the valve seat 34 by an elastic force of the valve spring 36 to close the air bypass valve 29. As a result, the intake air compressed by the turbocharger 25 is efficiently supplied to the cylinder 12 of the engine E.

When the rate of change in the throttle opening degree in the throttle valve closing direction is equal to or larger than the predetermined value (when the throttle valve 27 is suddenly closed), the PB pressure is introduced into the pressure chamber 35 by the control valve 37. At this time, in a state in which an intake air quantity of the second intake passage 21 is large and the P3 pressure is high, when the throttle valve 27 is suddenly closed, the P3 pressure in the second intake passage 21 instantaneously rises to a higher pressure and the PB pressure downstream the throttle valve 37 suddenly falls. Thus, a pressure difference between the P3 pressure and the PB pressure increases. Then, a combined force of the downward PB pressure and the elastic force of the valve spring 36 decreases to be smaller than the P3 pressure that urges the valve body 31 in the valve opening direction, thereby opening the air bypass valve 29.

As a result, the intake air compressed by the turbocharger 25 is returned from the second intake passage 21 to the first intake passage 20 via the bypass passage 28 and the air bypass valve 29. Thus, it is possible to prevent a pressure in the second intake passage 21 between the compressor 25a of the turbocharger 25 and the throttle valve 27 from becoming excessively large, thereby preventing occurrence of surging to protect the compressor 25a.

Besides when the throttle valve 27 is closed, the air bypass valve 29 is controlled to open when a supercharging pressure of the turbocharger 25 rises to be equal to or higher than a predetermined value and when the opening degree of the throttle valve 27 suddenly decreases.

Figure 3:
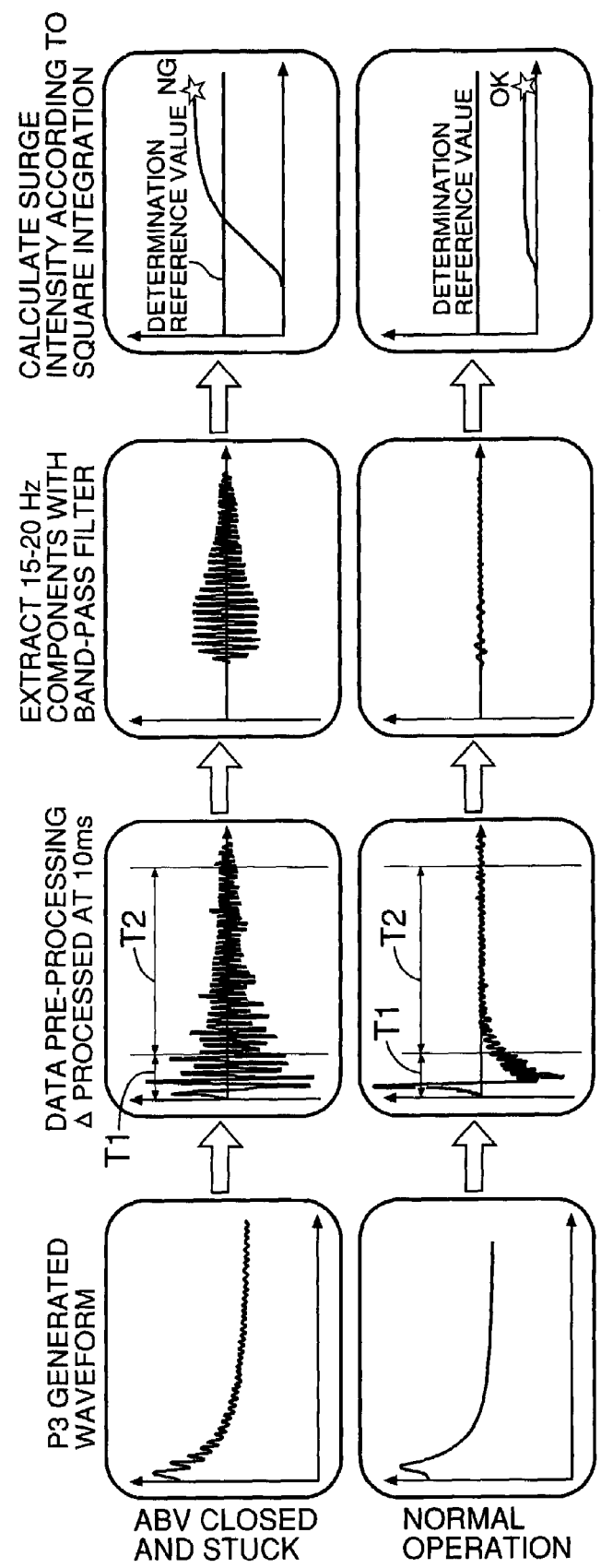
FIG. 3 is a diagram showing an outline of a method of failure detection.

If there occurs a valve closing failure where the air bypass valve 29 cannot be opened when the valve body 31 is stuck to the valve seat 34 or when the rod 32 is stuck to the guide member 33, there is a fear that the compressor 25a is damaged. Thus, it is required to detect such a valve closing failure. In this embodiment, when a valve closing failure of the air bypass valve 29 occurs, the valve closing failure of the air bypass valve 29 is detected on the basis of fluctuation in the P3 pressure due to the surging, paying notice to the finding that surging occurs in the second intake passage 21 upon closing of the throttle valve 27. A procedure of failure detection will be hereinafter described with reference to FIG. 3.

When the opening degree of the throttle valve 27 suddenly decreases, a command to the air bypass valve 29 is switched from a closing command to an opening command in order to prevent surging from occurring in the second intake passage 21 between the compressor 25a of the turbocharger 25 and the throttle valve 27. In this case, after a stabilization waiting time T1 elapses from the switching of the command, monitoring is started on the P3 pressure in the downstream section 21b of the second intake passage 21 leading to the air bypass valve 29. The monitoring is continued until a detection time T2 elapses.

When the air bypass valve 29 does not open due to the valve closing failure, surging occurs in the second intake passage 21, so that the P3 pressure gradually decreases while pulsating. However, when the air bypass valve 29 opens without problem, no surging occurs, so that the P3 pressure smoothly decreases. A difference of the P3 pressure is calculated at every 10 milliseconds, and the difference is filtered by a band-pass filter to extract a specific frequency component (e.g., 15 Hz to 20 Hz) of the surging. This specific frequency depends on a flow path diameter and a length of the second intake passage 21. The specific frequency component increases when the air bypass valve 29 fails, and decreases when the air bypass valve 29 is normal.

Subsequently, a square value of the specific frequency component is integrated at every 10 milliseconds, and the integrated value of the square values is compared with a determination reference value. When the integrated value exceeds the determination reference value, it is determined that surging has occurred, i.e., a valve closing failure of the air bypass valve 29 has occurred. When the integrated value is smaller than the determination reference value, it is determined that no surging has occurred, i.e., the air bypass valve 29 is normal.

Figure 13:
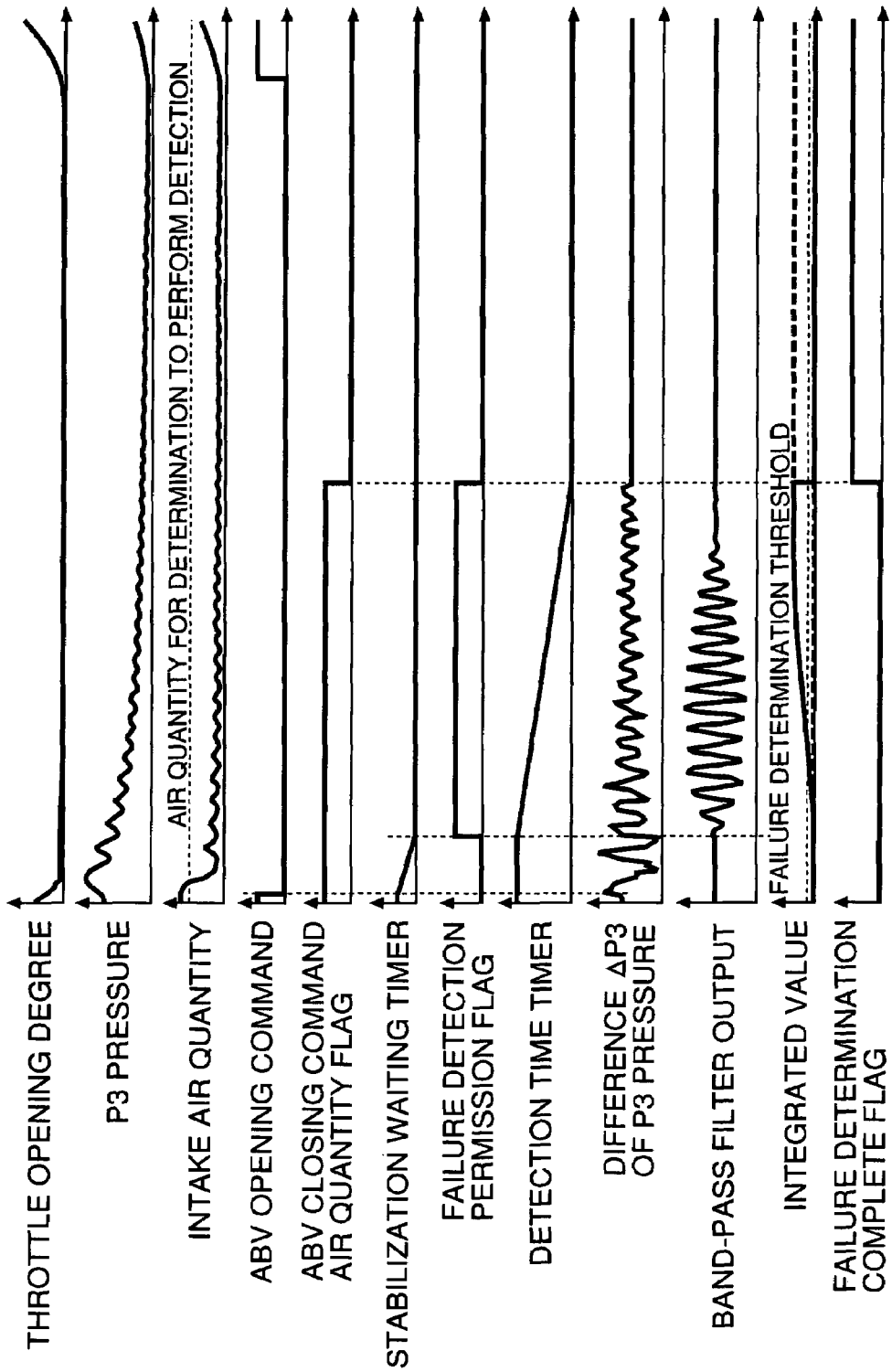
FIG. 13 is a time chart of failure detection.

The operation will be further described with reference to flowcharts of FIGS. 4 to 8 and a time chart of FIG. 13.

Figure 4:
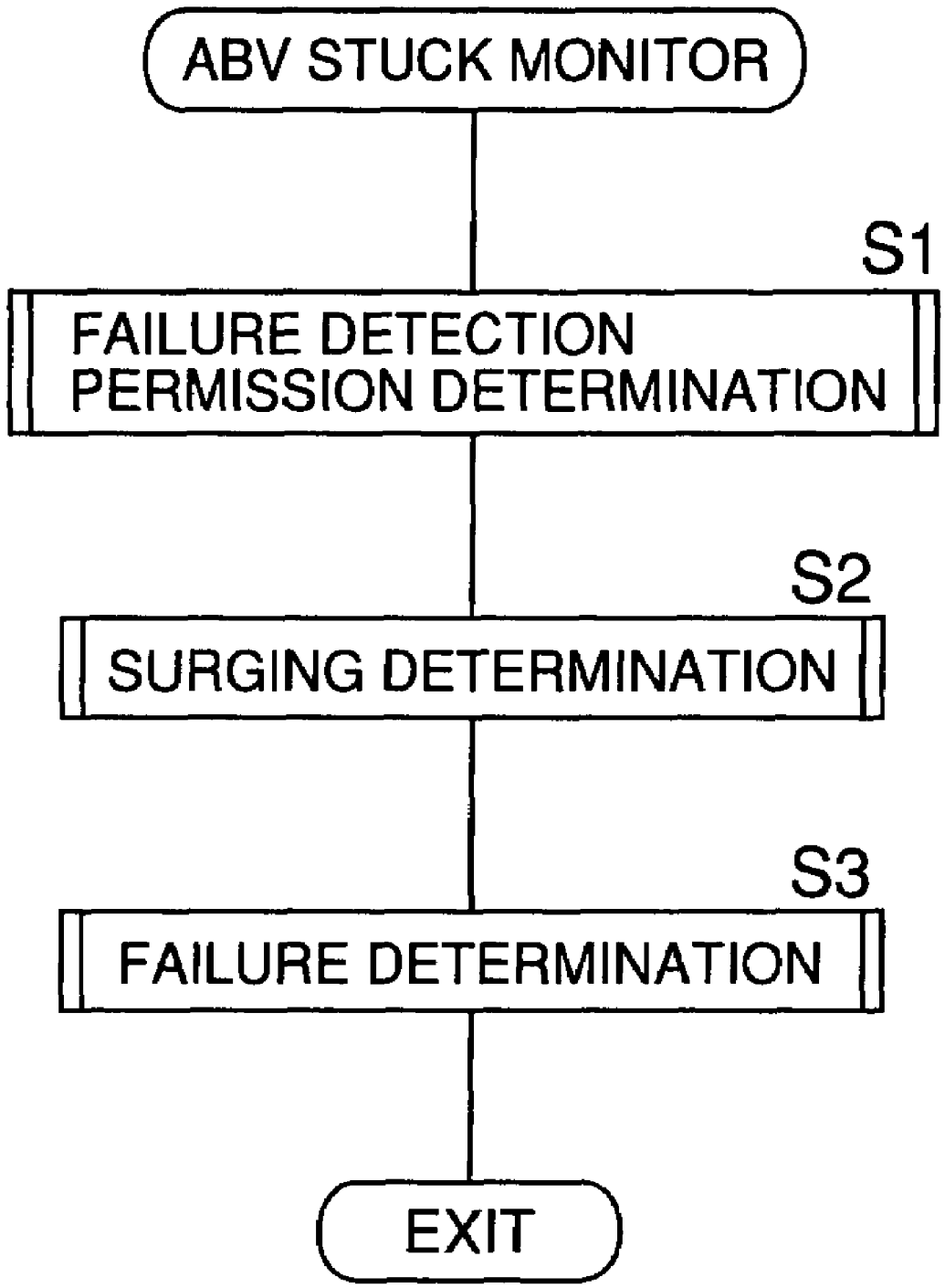
FIG. 4 is a flowchart of a main routine.

First, in step S1 in a main routine shown in FIG. 4, a failure detecting device according to the embodiment determines whether failure detection for the air bypass valve 29 should be permitted. This determination is performed on the basis of whether predetermined conditions for performing the failure detection are satisfied. In the following step S2, the failure detecting device determines a state of surging that occurs in the second intake passage 21. This determination is performed on the basis of fluctuation in the P3 pressure, which is the pressure in the downstream section 21b of the second intake passage 21. In the following step S3, the failure detecting device determines, on the basis of the state of the surging, whether the air bypass valve 29 has failed or is normally operating.

Figure 5:
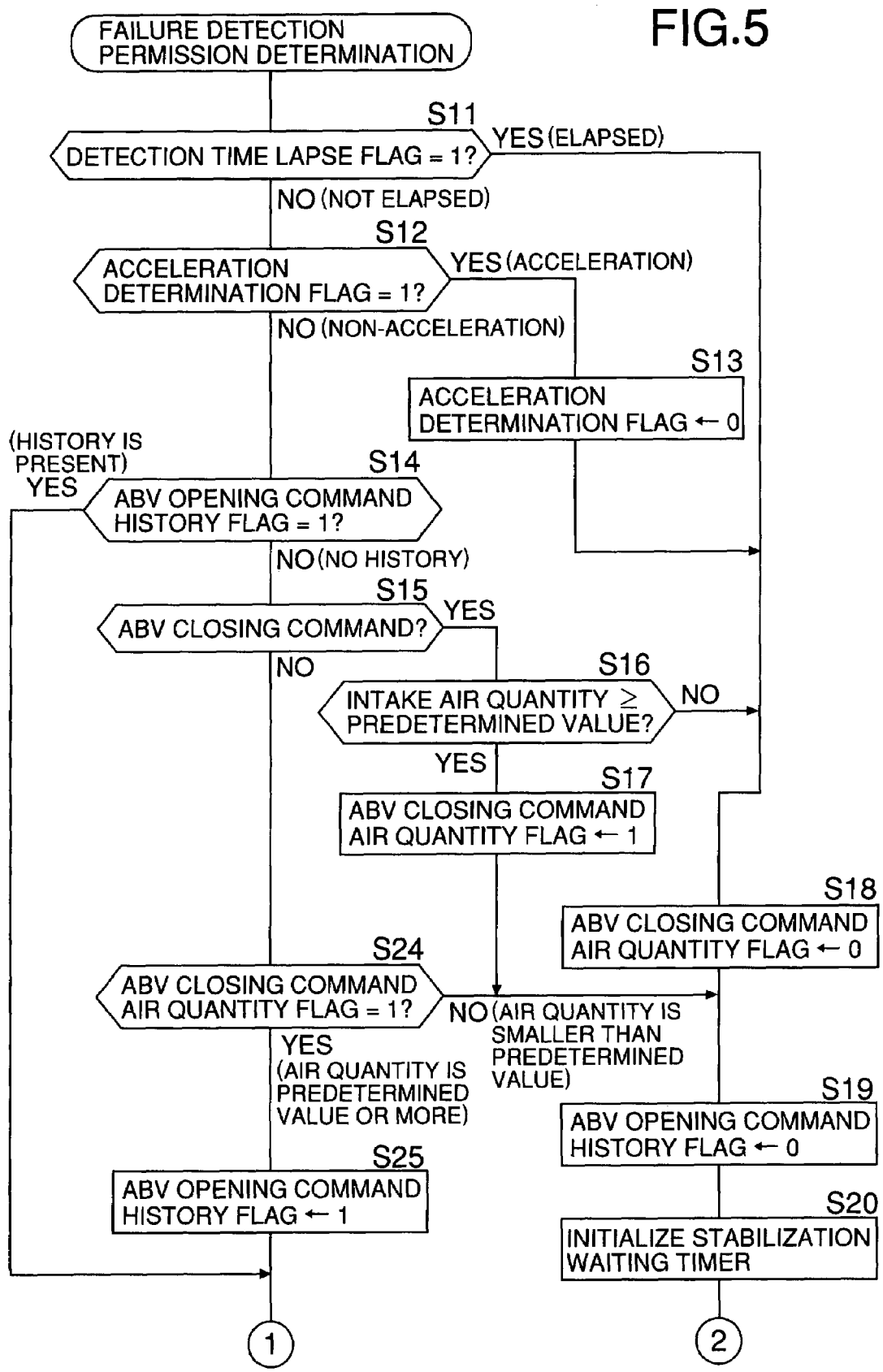
FIG. 5 is a first half of a flowchart of a failure detection permission routine.
Figure 6:
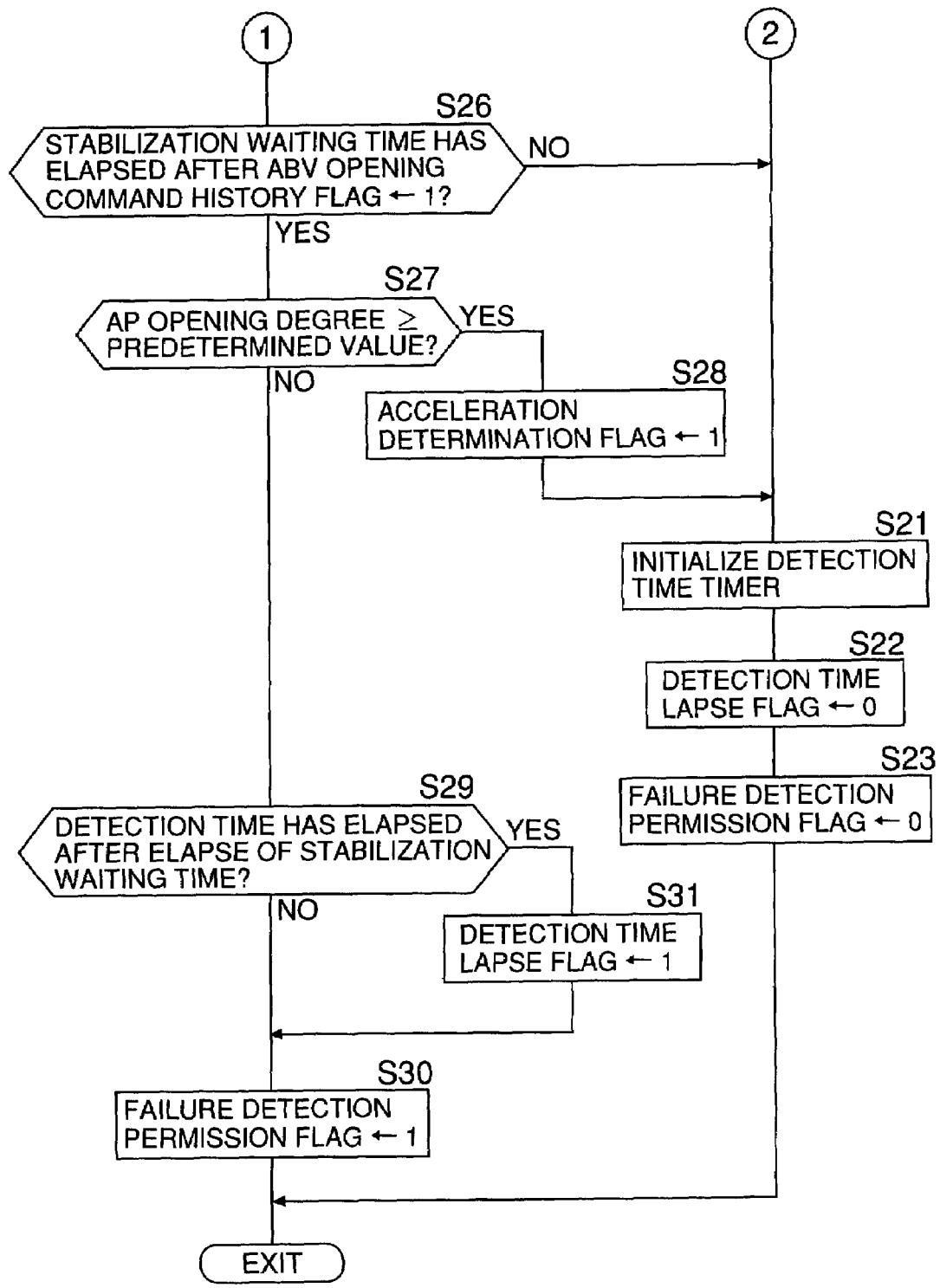
FIG. 6 is a second half of the flowchart of the failure detection permission routine.

A subroutine of step S1 (failure detection permission determination) in FIG. 4 will be described with reference to FIGS. 5 and 6.

First, if a detection time lapse flag is "0" in step S11, i.e., a detection time has not elapsed, if an acceleration determination flag is "0" in step S12, i.e., the vehicle is not in an acceleration state, and if an air bypass valve opening command history flag is "0" in step S14, i.e., there is no history of an opening command, then it is determined in step S15 whether a closing command for the air bypass valve 29 has been outputted. When it is confirmed in step S15 that the closing command has been outputted, an intake air quantity of the engine E detected by an air flowmeter (not shown) is compared with a predetermined value in step S16.

As a result, when the intake air quantity is equal to or larger than the predetermined value, an air bypass valve closing command air quantity flag is set to "1" in step S17. When the intake air quantity is smaller than the predetermined value, the air bypass valve closing command air quantity flag is reset to "0" in step S18. Then, the air bypass valve opening command history flag is reset to "0" in step S19; a stabilization waiting timer (later described) is initialized in step S20; and a detection time timer (later described) is initialized in step S21; the detection time lapse flag is reset to "0" in step S22; the failure detection permission flag is reset to "0" in step S23 so that the failure detection is not permitted.

If the detection time lapse flag is "1" in step S11, i.e., the detection time has elapsed, the procedure proceeds to steps S18 to S23 to cancel the failure detection. If the acceleration determination flag is "1" in step S12, i.e., the vehicle is in the acceleration state, the acceleration determination flag is reset to "0" in step S13, and the procedure proceeds to steps S18 to S23 to cancel the failure detection.

On the other hand, in the case where the closing command for the air bypass valve 29 is not outputted in step S15, i.e., an opening command for the air bypass valve 29 is outputted, if the air bypass valve closing command time air quantity flag is not "1" in step S24, i.e., if the intake air quantity of the engine E is smaller than the predetermined value, the procedure proceeds to steps S19 to S23 to cancel the failure detection. If the air bypass valve closing command time air quantity flag is "1" in step S24, i.e., if the intake air quantity of the engine E is equal to or larger than the predetermined value, the air bypass valve opening command history flag is set to "1" in step S25.

When the air bypass valve opening command history flag is set to "1" as described above, an answer in step S14 in the next loop is YES so that steps S15 to S25 are skipped.

If a stabilization waiting time (see T1 in FIG. 3) counted by the stabilization waiting timer (see step S20) after the air bypass valve opening command history flag is set to "1" has not elapsed in step S26, the procedure proceeds to steps S21 to S23 to cancel the failure detection. On the other hand, if the stabilization waiting time has elapsed in step S26, the failure detecting device determines in step S27 whether an accelerator pedal opening degree is equal to or larger than a predetermined value. If the accelerator pedal opening degree is equal to or larger than the predetermined value in step S27, i.e., the vehicle is in the acceleration state, the acceleration determination flag is set to "1" in step S28 and then the procedure proceeds to steps S21 to S23 to cancel the failure detection.

When the accelerator pedal opening degree is smaller than the predetermined value in step S27, i.e., the vehicle is not in the acceleration state, it is determined in step S29 whether a detection time (see T2 in FIG. 3) counted by the detection time timer (see step S21) after the elapse of the stabilization waiting time has elapsed. If the detection time has not elapsed, the failure detection permission flag is immediately set to "1" in step S30 to permit the failure detection. If the detection time has elapsed, the detection time lapse flag is set to "1"0 in step S31, and then the procedure proceeds to step S30.

As described above, when the intake air quantity of the engine E immediately before the command to the air bypass valve 29 is switched from the closing command to the opening command is equal to or larger than the predetermined value and the predetermined stabilization waiting time has elapsed after the opening command is outputted to the air bypass valve 29, the failure detection for the air bypass valve 29 is permitted.

The failure detection is permitted only when the intake air quantity of the engine E immediately before the command to the air bypass valve 29 is switched from the closing command to the opening command is equal to or larger than the predetermined value. This is because, in a state in which the intake air quantity is smaller than the predetermined value, even if the valve closing failure of the air bypass valve 29 occurs so that the air bypass valve 29 does not open, there is a possibility that it is erroneously determined that the air bypass valve 29 is normal (the valve closing failure has not occurred) because surging does not occur in the second intake passage 21.

The stabilization waiting time is provided because the P3 pressure in the second intake passage 21, which is a parameter for performing the failure detection, suddenly rises immediately after the closing command is switched to the opening command in the state in which the valve closing failure of the air bypass valve 29 has occurred, so that even if the air bypass valve 29 is normally operating, pressure fluctuation occurs in the specific frequency for determining the occurrence of surging.

The detection time is provided because detected values are accumulated in a sufficient amount until the detection time elapses in order to reduce an influence of the noise, since the noise is inevitably contained in each detected value of the P3 pressure.

Figure 7:
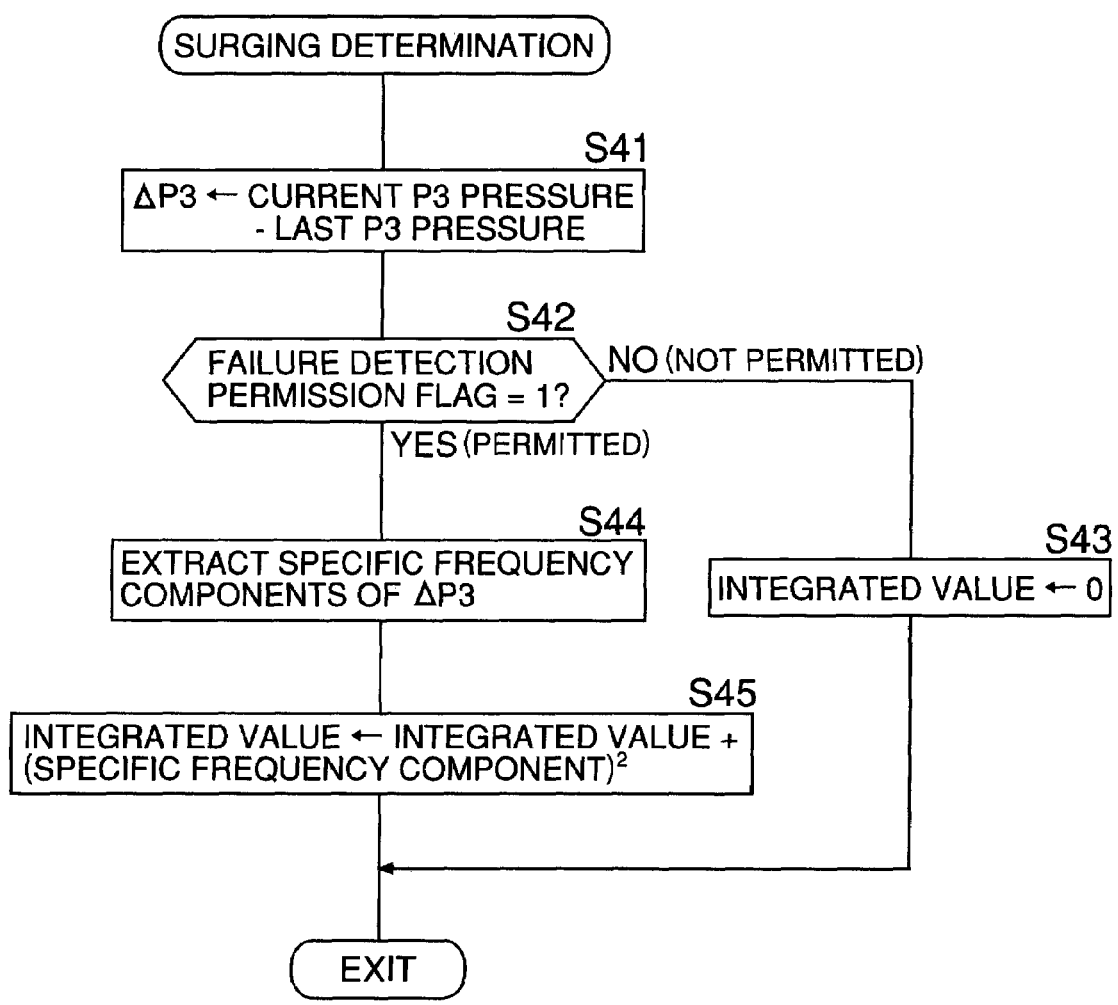
FIG. 7 is a flowchart of a surging determination routine.

A sub-routine in step S2 (surging determination) in FIG. 4 will be described with reference to FIG. 7.

First, a difference ΔP3 between a last value and a present value of the P3 pressure is calculated in step S41. This calculation is performed at 10 milliseconds intervals. If the failure detection permission flag is not "1" in step S42, i.e., the failure detection is not permitted, an integrated value (later described) is set to 0 in step S43. On the other hand, if the failure detection permission flag is "1" in step S42, i.e., the failure detection is permitted, the difference ΔP3 is filtered with the band-pass filter in step S44 to extract a specific frequency component (e.g., 15 Hz to 20 Hz). This specific frequency depends on a flow path diameter and a length of the second intake passage 21. In the subsequent step S45, a square value of the specific frequency component is added to a last integrated value to update the integrated value.

Figure 8:
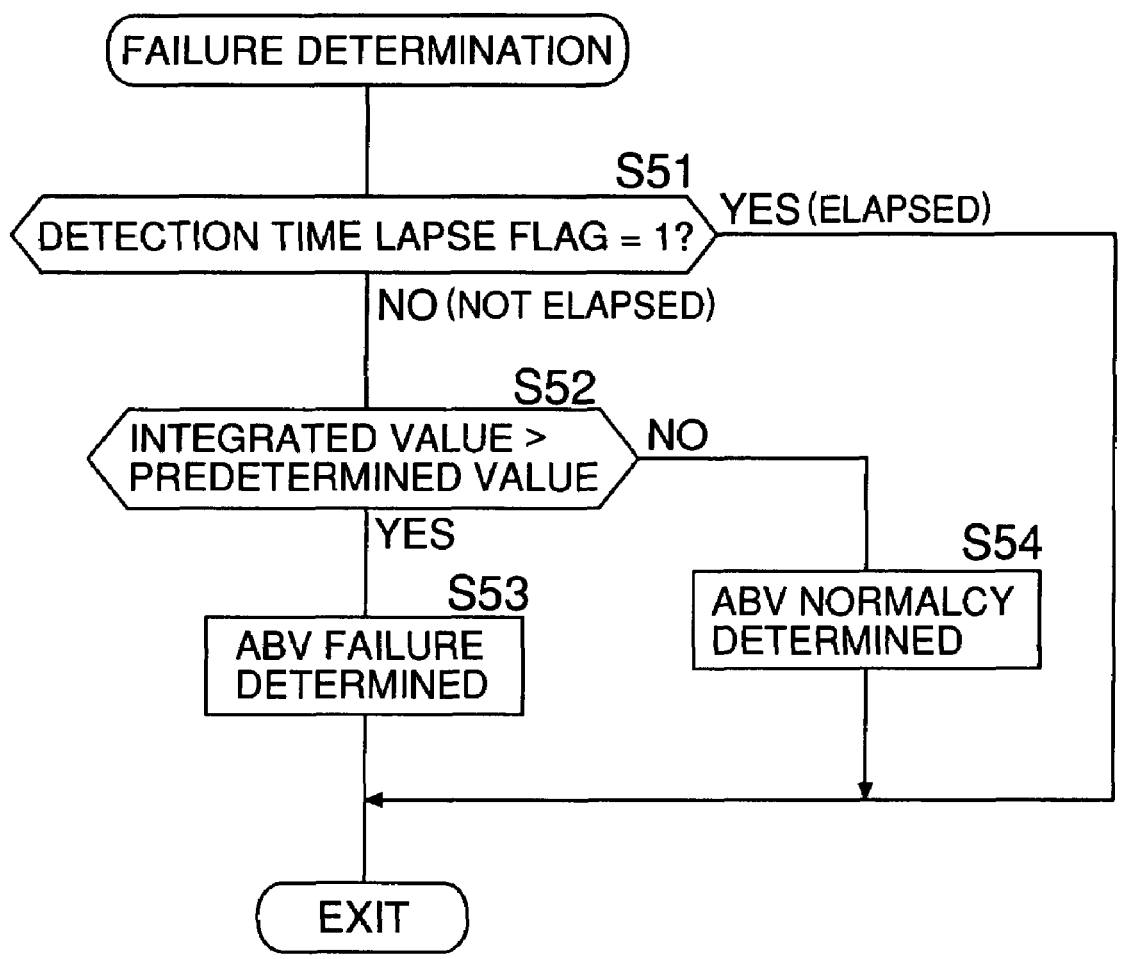
FIG. 8 is a flowchart of a failure determination routine.

A subroutine of step S3 (failure determination) in FIG. 4 will be described with reference to FIG. 8.

First, if the detection time has elapsed in step S51, the integrated value is compared with a predetermined value in step S52. When the integrated value exceeds the predetermined value, it is determined in step S53 that valve closing failure of the air bypass valve 29 has occurred. When the integrated value is smaller than the predetermined value, it is determined in step S54 that the air bypass valve 29 is normal.

Figure 9:
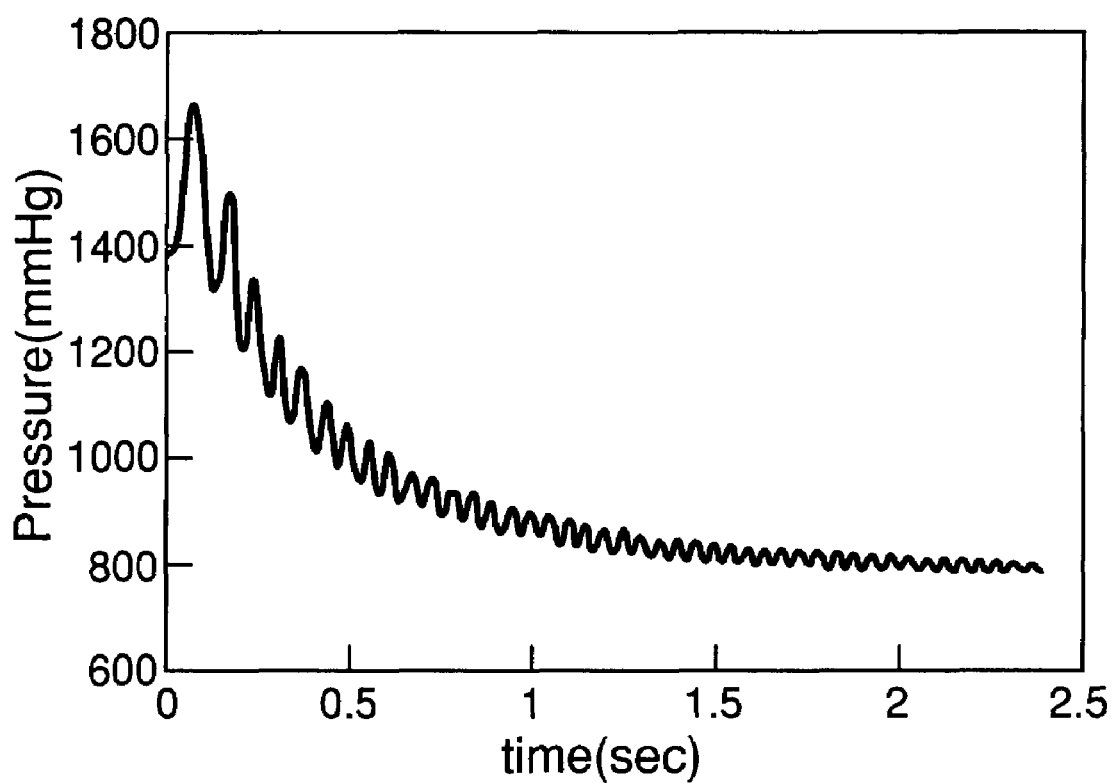
FIG. 9 is a graph of a generated waveform of a P3 pressure.
Figure 10:
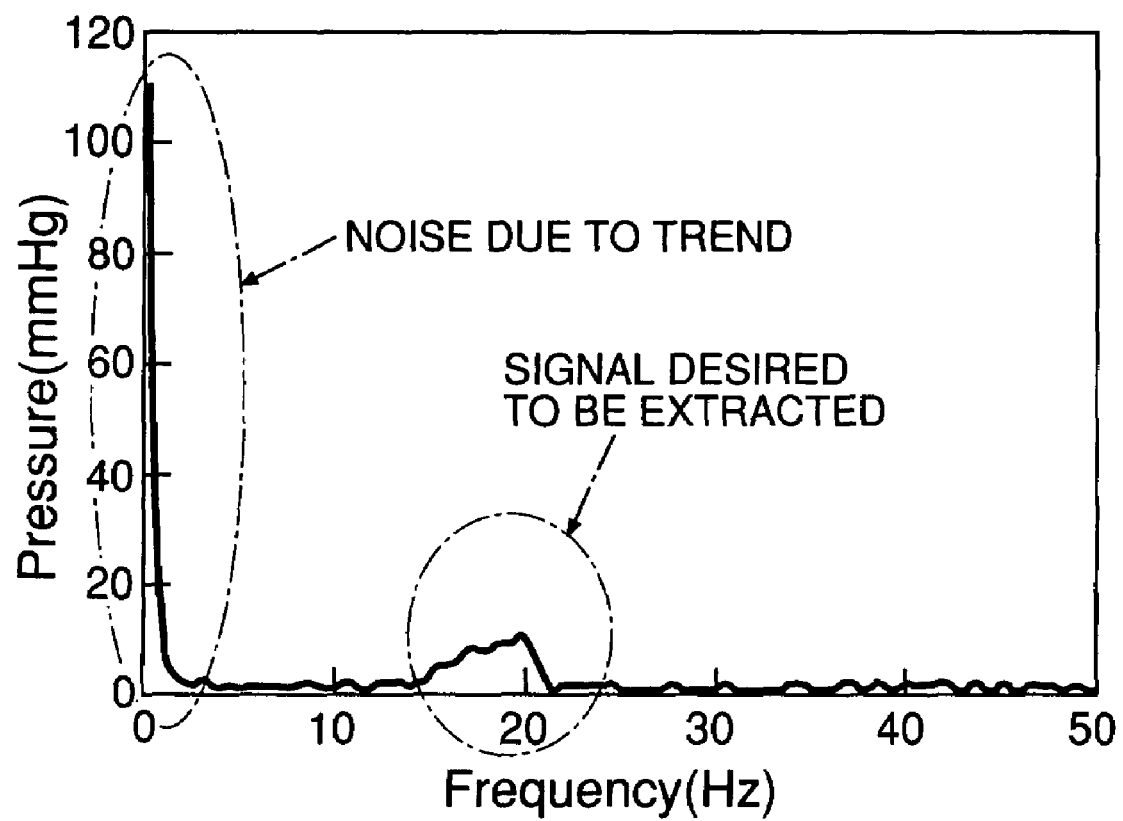
FIG. 10 is a graph of a spectrum of the P3 pressure.

FIG. 9 is a generated waveform of the P3 pressure at the time when surging occurs. FIG. 10 is a spectrum of the P3 pressure. This spectrum includes noise due to a trend and a signal desired to be extracted. In this state, however, it is impossible to discriminate the noise and the signal from each other.

Figure 11:
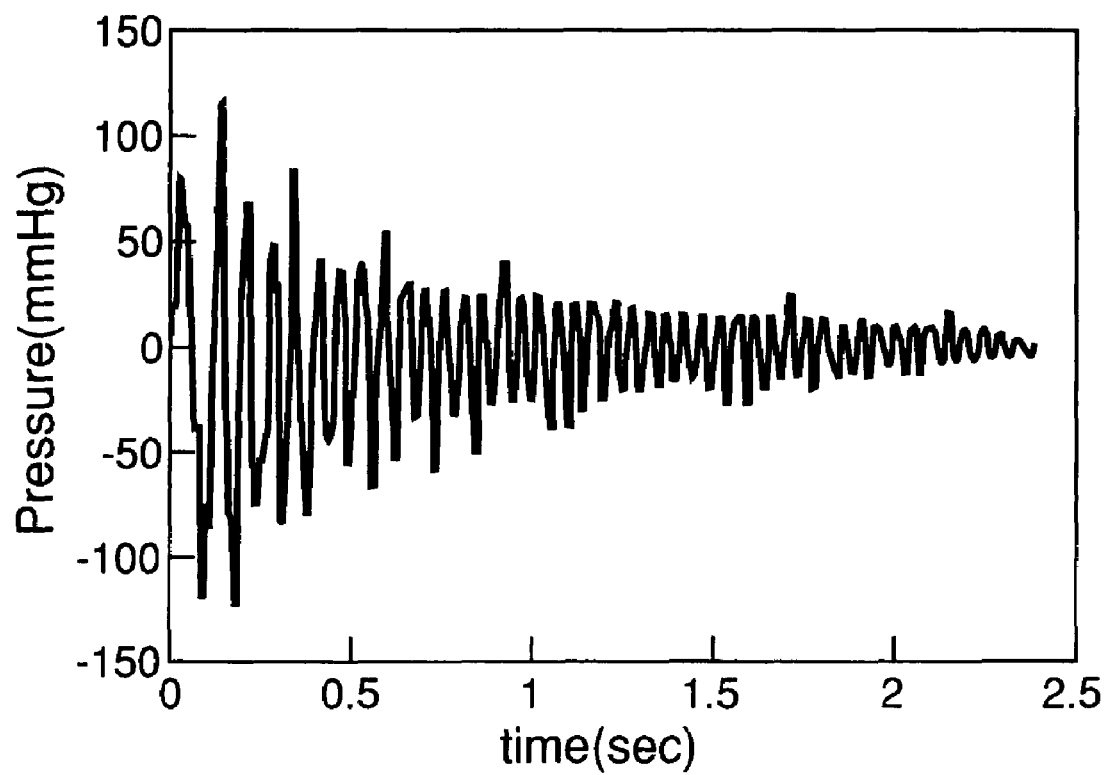
FIG. 11 is a graph of a difference ΔP3 of the P3 pressure.
Figure 12:
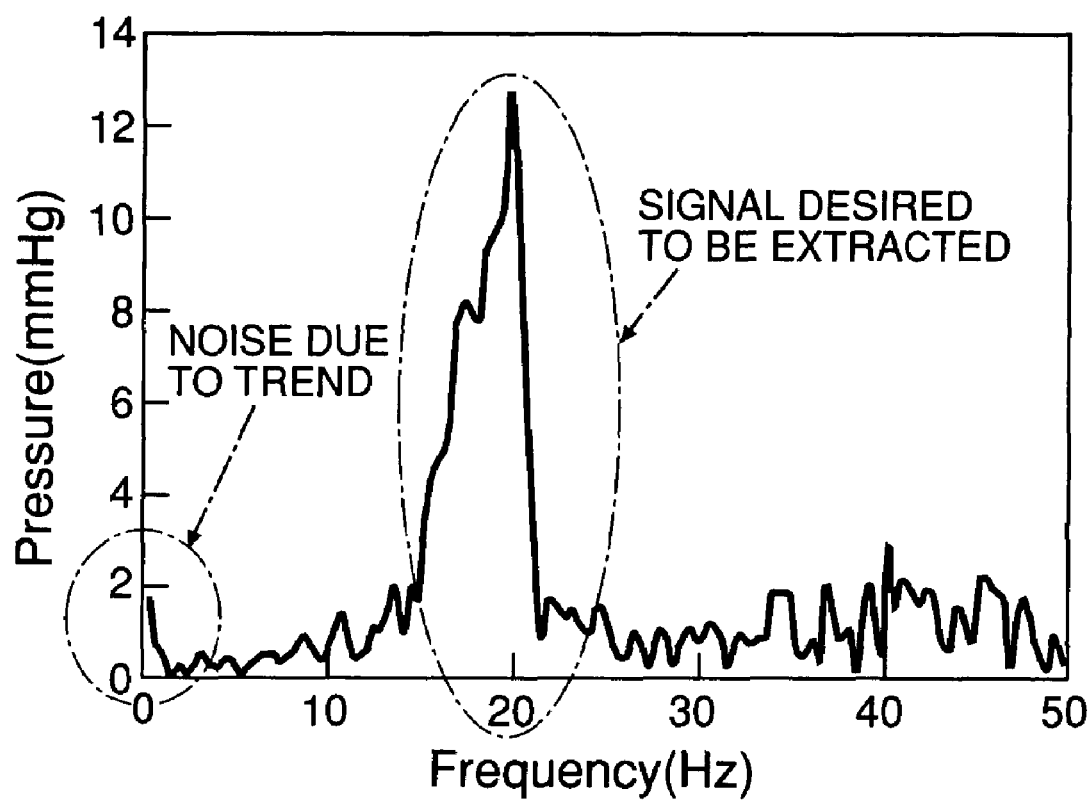
FIG. 12 is a graph of a spectrum of the difference ΔP3 pressure.

FIG. 11 is a difference at every 10 milliseconds of the generated waveform in FIG. 9. FIG. 12 is a spectrum of the differences. It is possible to emphasize a signal of a frequency peculiar to surging to reliably identify the signal from noise by calculating a difference ΔP3 of the generated waveform of the P3 pressure.

Since the failure detection is performed on the basis of the integrated value obtained by integrating the square values of the difference $\Delta P3$ of the P3 pressure over the predetermined detection time, it is possible to more reliably eliminate the influence of the noise to improve detection accuracy.

The embodiment of the present invention has been described above, but various changes in design may be made without departing from the subject matter of the present invention.

For example, although the turbocharger 25 is used as the supercharging device in the embodiment, the present invention is applicable to a device that uses an ordinary supercharger as the supercharging device.

Although occurrence of surging is determined on the basis of fluctuation in an intake pressure in the second intake passage 21 in the embodiment, it is also possible to determine occurrence of surging on the basis of fluctuation in an intake air quantity instead of the fluctuation in the intake pressure.

What is claimed is:

1. An air bypass valve failure detection device in a supercharging device of an engine,
   the supercharging device comprising:
      a first intake passage, a supercharger, a second intake passage, a throttle valve, and a third intake passage which are sequentially arranged from an upstream side to a downstream side in a flowing direction of an intake air flowing to a cylinder of the engine;
      a bypass passage bypassing the supercharger and connecting the first and second intake passages to each other;
      an air bypass valve provided in the bypass passage;
      the supercharging device outputting an opening command to the air bypass valve when a rate of change in a throttle valve opening degree is equal to or larger than a predetermined value in a throttle valve closing direction;
   the air bypass valve failure detection device comprising:
      failure detection permitting means for permitting failure detection for the air bypass valve when a command to the air bypass valve is an opening command and an intake air quantity of the engine immediately before the command is changed from a closing command to the opening command is equal to or larger than a predetermined value;
      surging determining means for determining whether surging has occurred in the second intake passage when the failure detection permitting means permits the failure detection for the air bypass valve; and
      failure determining means for determining that valve closing failure of the air bypass valve has occurred when the surging determining means determines that surging has occurred, and determining that the air bypass valve is normal when the surging determining means determines that surging has not occurred.

2. The air bypass valve failure detection device in a supercharging device of an engine according to claim 1, wherein the surging determining means extracts a specific frequency component of fluctuation in an intake pressure or fluctuation in an intake air quantity in the second intake passage, and determines that surging has occurred when an integrated value of the extracted values exceeds a predetermined value.

3. The air bypass valve failure detection device in a supercharging device of an engine according to claim 2, wherein the failure detection permitting means does not permit the failure detection until a predetermined time elapses after the command to the air bypass valve is changed from the closing command to the opening command.

4. The air bypass valve failure detection device in a supercharging device of an engine according to claim 2, wherein the surging determining means calculates the integrated value until a predetermined time elapses after the failure detection permitting means permits the failure detection; and the failure determining means determines that surging has occurred when the integrated value upon lapse of the predetermined time exceeds the predetermined value.

5. The air bypass valve failure detection device in a supercharging device of an engine according to claim 4, wherein the failure detection permitting means cancels the failure detection when the predetermined time elapses after the failure detection is permitted; and the surging determining means reduces the integrated value to zero when the failure detection permitting means cancels the failure detection.

6. An air bypass valve failure detection device in a supercharging device of an engine,
   the supercharging device comprising:
      a first intake passage, a supercharger, a second intake passage, a throttle valve, and a third intake passage which are sequentially arranged from an upstream side to a downstream side in a flowing direction of an intake air flowing to a cylinder of the engine;
      a bypass passage bypassing the supercharger and connecting the first and second intake passages to each other;
      an air bypass valve provided in the bypass passage;
      the supercharging device outputting an opening command to the air bypass valve when a rate of change in a throttle valve opening degree is equal to or larger than a predetermined value in a throttle valve closing direction;
   the air bypass valve failure detection device comprising:
      a failure detection permitting device for permitting failure detection for the air bypass valve when a command to the air bypass valve is an opening command and an intake air quantity of the engine immediately before the command is changed from a closing command to the opening command is equal to or larger than a predetermined value;
      a surging determiner for determining whether surging has occurred in the second intake passage when the failure detection permitting device permits the failure detection for the air bypass valve; and
      a failure determiner for determining that valve closing failure of the air bypass valve has occurred when the surging determiner determines that surging has occurred, and determining that the air bypass valve is normal when the surging determiner determines that surging has not occurred.

7. The air bypass valve failure detection device in a supercharging device of an engine according to claim 6, wherein the surging determiner extracts a specific frequency component of fluctuation in an intake pressure or fluctuation in an intake air quantity in the second intake passage, and determines that surging has occurred when an integrated value of the extracted values exceeds a predetermined value.

8. The air bypass valve failure detection device in a supercharging device of an engine according to claim 7, wherein the failure detection permitting device does not permit the failure detection until a predetermined time elapses after the command to the air bypass valve is changed from the closing command to the opening command.

9. The air bypass valve failure detection device in a supercharging device of an engine according to claim 7, wherein the surging determiner calculates the integrated value until a predetermined time elapses after the failure detection permitting device permits the failure detection; and the failure determiner determines that surging has occurred when the integrated value upon lapse of the predetermined time exceeds the predetermined value.

10. The air bypass valve failure detection device in a supercharging device of an engine according to claim 9, wherein the failure detection permitting device cancels the failure detection when the predetermined time elapses after the failure detection is permitted; and the surging determiner reduces the integrated value to zero when the failure detection permitting device cancels the failure detection.

* * * * *